US010713056B2

(12) United States Patent
Mueller et al.

(10) Patent No.: US 10,713,056 B2
(45) Date of Patent: *Jul. 14, 2020

(54) WIDE VECTOR EXECUTION IN SINGLE THREAD MODE FOR AN OUT-OF-ORDER PROCESSOR

(71) Applicant: International Business Machines Corporation, Armonk, NY (US)

(72) Inventors: Silvia M. Mueller, Altdorf (DE); Mauricio J. Serrano, Bronx, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/806,419

(22) Filed: Nov. 8, 2017

(65) Prior Publication Data

US 2019/0042266 A1 Feb. 7, 2019

Related U.S. Application Data

(63) Continuation of application No. 15/665,653, filed on Aug. 1, 2017.

(51) Int. Cl.
*G06F 9/38* (2018.01)
*G06F 9/30* (2018.01)

(52) U.S. Cl.
CPC .......... *G06F 9/3836* (2013.01); *G06F 9/3012* (2013.01); *G06F 9/3885* (2013.01)

(58) Field of Classification Search
CPC .. G06F 9/3853; G06F 9/30036; G06F 9/3836; G06F 9/3885; G06F 9/3851; G06F 9/3887; G06F 15/8007
See application file for complete search history.

(56) References Cited

U.S. PATENT DOCUMENTS

| 7,051,329 | B1 * | 5/2006 | Boggs ................. G06F 9/30123 712/E9.027 |
| 7,945,764 | B2 | 5/2011 | Mejdrich et al. |
| 9,250,899 | B2 | 2/2016 | Gschwind |

(Continued)

OTHER PUBLICATIONS

List of IBM Patents or Patent Application Treated as Related; AUS820161038US02, Date Filed: Nov. 8, 2017, pp. 1-2.

(Continued)

*Primary Examiner* — Michael Sun
(74) *Attorney, Agent, or Firm* — Cantor Colburn LLP; Jason Sosa (57) ABSTRACT

A non-limiting example of a computer-implemented method for implementing wide vector execution for an out-of-order processor includes entering, by the out-of-order processor, a single thread mode. The method further includes partitioning, by the out-of-order processor, a vector register file into a plurality of register files, each of the plurality of register files being associated with a vector execution unit, the vector execution units forming a wide vector execution unit. The method further includes receiving, by a vector scalar register of the out-of-order processor, a wide vector instruction. The method further includes processing, by the wide vector execution unit, the wide vector instruction.

7 Claims, 7 Drawing Sheets

(56) References Cited

U.S. PATENT DOCUMENTS

| | | | | |
|---|---|---|---|---|
| 10,481,915 B2* | 11/2019 | Lloyd | ................ | G06F 12/0875 |
| 2002/0156999 A1* | 10/2002 | Eickemeyer | ........ | G06F 9/30123 |
| | | | | 712/228 |
| 2003/0163669 A1* | 8/2003 | DeLano | ................ | G06F 9/3828 |
| | | | | 712/24 |
| 2004/0128475 A1* | 7/2004 | Sheaffer | ................ | G06F 9/3012 |
| | | | | 712/32 |
| 2004/0181652 A1* | 9/2004 | Ahmed | .............. | G06F 9/30036 |
| | | | | 712/215 |
| 2008/0046683 A1 | 2/2008 | Codrescu et al. | | |
| 2009/0113187 A1* | 4/2009 | Hansen | .............. | G06F 9/30014 |
| | | | | 712/225 |
| 2010/0274972 A1* | 10/2010 | Babayan | .............. | G06F 9/3842 |
| | | | | 711/125 |
| 2011/0320765 A1* | 12/2011 | Karkhanis | ........... | G06F 9/30109 |
| | | | | 712/7 |
| 2016/0085551 A1* | 3/2016 | Greathouse | ........... | G06F 9/3887 |
| | | | | 712/206 |
| 2019/0087195 A1* | 3/2019 | Lloyd | ................ | G06F 9/30189 |

OTHER PUBLICATIONS

Silvia M. Mueller, et al.,"Wide Vector Execution in Single Thread Mode for an Out-Of-Order Processor," U.S. Appl. No. 15/665,653, filed Aug. 1, 2017.

\* cited by examiner

WIDE VECTOR EXECUTION IN SINGLE THREAD MODE FOR AN OUT-OF-ORDER PROCESSOR

This application is a continuation of U.S. patent application Ser. No. 15/665,653, entitled "WIDE VECTOR EXECUTION IN SINGLE THREAD MODE FOR AN OUT-OF-ORDER PROCESSOR," filed Aug. 1, 2017, the disclosure of which is incorporated by reference herein in its entirety.

BACKGROUND

Embodiments of the present invention related in general to instruction sequencing in an out-of-order (OoO) processor, and more specifically to wide vector execution in a single thread mode for an out-of-order processor.

In an out-of-order (OoO) processor, an instruction sequencing unit (ISU) dispatches instructions to various issue queues, renames registers in support of OoO execution, issues instructions from the various issue queues to the execution pipelines, completes execution instructions, and handles exception conditions. Register renaming is typically performed by mapper logic in the ISU before the instructions are placed in their respective issue queues.

SUMMARY

Embodiments of the present invention include methods, systems, and computer program products for implementing wide vector execution in a single thread mode for an out-of-order processor. A non-limiting example of the computer-implemented method includes entering, by the out-of-order processor, a single thread mode. The method further includes partitioning, by the out-of-order processor, a vector register file into a plurality of register files, each of the plurality of register files being associated with a vector execution unit, the vector execution units forming a wide vector execution unit. The method further includes receiving, by a vector scalar register of the out-of-order processor, a wide vector instruction. The method further includes processing, by the wide vector execution unit, the wide vector instruction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Out-of-order (OoO) processors execute instructions in an order based on the availability of input data instead of by the instructions' original order in a program. This enables OoO processors to avoid being idle while waiting for a preceding instruction to complete before retrieving data for a next instruction in a program and to process the next instructions that are able to run immediately and independently. Accordingly, OoO processors reduce wasted cycles because instruction cycles that would otherwise be wasted by delay can be utilized.

Some OoO processors utilize different modes or operating states for processing instructions. For example, an OoO processor can operate in a single thread mode to execute instructions in a single thread (ST) and can operate in a multithread (MT) mode to execute instructions in multiple threads. MT mode can include different types of simultaneous multithreading (SMT) modes (e.g., symmetric multiprocessing 2 (SMP2), symmetric multiprocessing 4 (SMP 4), etc.), which are described in more detail herein.

OoO processors typically have a fixed vector width (e.g., 128-bits). There is a desire to increase the vector width, such as to 512-bits or 1024-bits. However, expanding vector width is very expensive. For example, there are at least four threads (per core) in some existing OoO processor designs, so increasing the width affects the register file growth significantly. For example, if four threads are maintained for wide vector execution, then the bits for the architected states grow by a factor of four to 512-bits wide. There is also a growth in the number of bits being read or written.

In order to increase OoO processor vector width (e.g., an increase from 128b to 512b), existing code must include a significant amount of instruction level parallelism involving a large number of 128b operations. Consequently, workloads using the OoO processor's pipeline are likely doing so heavily, preventing much gain from SMT execution.

To reduce system costs, embodiments of the present invention enable wide vector execution when the OoO processor is in a single thread mode. For example, the present techniques provide wide vector execution in single thread mode by borrowing SMT mode registers. SMT is a processor technology that allows multiple instruction streams (threads) to run concurrently on the same physical processor, improving overall throughput.

The OoO processor architecture uses four threads of 64 entries. Using the present techniques, only one of the four threads is allowed to use wide vector. In particular, the present techniques repartition entries in a register file to achieve a vector that is four times wider for ST mode. Extra wires are added in silicon to support split allocation. For example, three read and four write wires may be used for each partitioned portion of a file registry to the 128-bit wide vectors to achieve a 512-bit wide vector. Register file size is similar, but when executing 512b-wide vector, it only supports ST mode (SMT2 or SMT4 mode execution does not get 512b wide vector facility).

In order to have significant benefit for going from 128-bit to 512-bit vector width, the existing code must have a huge amount of instruction level parallelism (ILP) involving a large number of 128-bit operations. That means the workload is likely using the pipeline very heavily, preventing much gain from SMT execution.

To reduce cost, the present techniques allow wide vector execution only when the core can be put in an ST mode. In such cases, the 512-bit operations are allowed in ST mode only. To store the architected states the processor does not need any additional bits. The OoO processor architecture has 64×128-bits per thread. In the SMT4 mode, that is 4×64× 128-bits. According to the present techniques, 64×512-bits can be provided in ST mode only. In other examples, it is possible to have 32×1024-bits in ST mode only.

Figure 1:
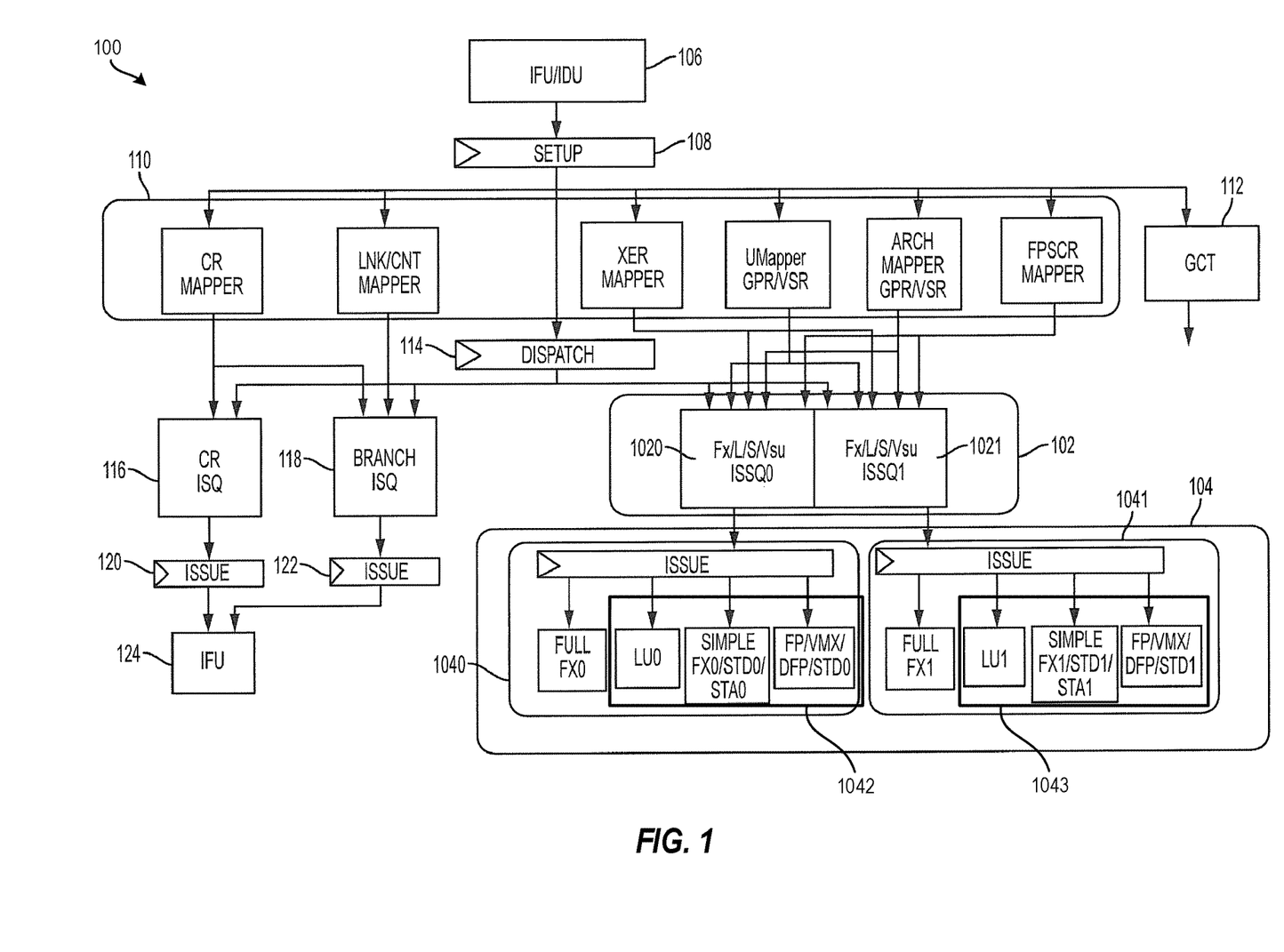
FIG. 1 depicts a block diagram of a processing system that includes an instruction sequencing unit (ISU) of an out-of-order (OoO) processor for implementing wide vector execution in a single thread mode according to one or more embodiments of the present invention.

Turning now to FIG. 1, a block diagram of a processing system 100 that includes an instruction sequencing unit (ISU) of an out-of-order (OoO) processor wide vector execution in a single thread mode is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 is shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scalar unit (VSU) instructions. As shown in the embodiment of FIG. 1, issue queue 102 is broken up into two parts, ISQ0 1020 and ISQ1 1021, each portion holding forty-eight instructions.

When the processor is executing in single thread (ST) mode, the issue queue 102 can be used as a single logical issue queue that contains both ISQ0 1020 and ISQ1 1021 to process all of the instructions (in this example all ninety-six instructions) of a single thread. When the processor is executing in MT mode, ISQ0 1020 can be used to process forty-eight instructions from a first thread and ISQ1 1021 is used to process forty-eight instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FPNMX/DFP/STD0 form a load-store unit (LSU) 1042. Similarly, the LU1, the Simple FX1/STD1/STA1, and the FP/VMX/DFP/STD1 form a load-store unit (LSU) 1043.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
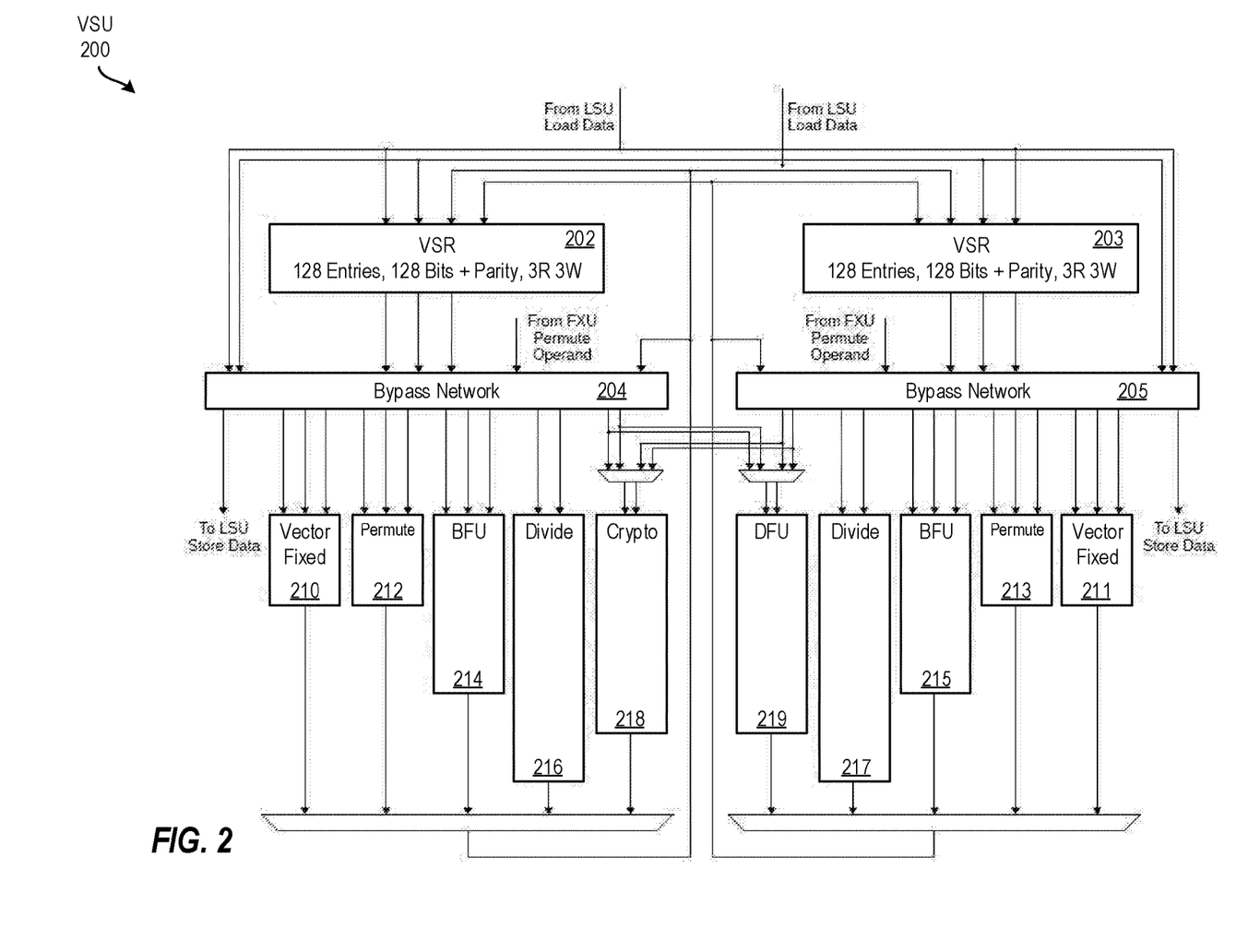
FIG. 2 depicts a block diagram of a vector-and-scalar unit (VSU) 200 that supports 128 bit wide vectors and up to 4 threads according to one or more embodiments of the present invention.

Turning now to FIG. 2, a block diagram of a vector-and-scalar unit (VSU) 200 that supports 128 bit wide vectors and up to 4 threads according to one or more embodiments of the invention. The VSU 200 includes various components/modules configured and arranged as shown. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as field programmable gate arrays (FPGAs) as embedded controllers, hardwired circuitry, etc.), or as some combination or combinations of these.

The VSU 200 is configurable to operate in one or more modes, including ST mode and MT mode. According to exemplary embodiments of the present invention, the VSU 200 is configured to operate in one of an ST mode, an SMT2 mode, and an SMT4 mode. SMT enables separate instruction streams, or threads, to run concurrently on the same physical processor, or core. For example, in the ST mode, 1 thread runs. However, in the SMT2 mode, 2 threads run concurrently, and in the SMT4 mode, 4 threads run concurrently.

Load data are received from a load-store unit (e.g., the LSU 1042 and/or the LSU 1043) of the system 100 of FIG. 1. The load data are input into a vector-scalar register (VSR) (e.g., VSR 202, VSR 203) of the VSU 200. According to the embodiment of the present invention shown in FIG. 2, each VSR 202, 203 is a 128 entry, 128 bits (plus parity) register.

The load data are then sent from the VSR 202, 203 to bypass networks 204, 205 respectively. The VSR 202 sends the load data to the LSU (e.g., LSU 1042) as store data and to one of a vector fixed module 210, a permute module 212, a binary floating-point unit (BFU) module 214, a divide module 216, or a crypto module 218. Similarly, the VSR 203 sends the load data to the LSU (e.g., LSU 1043) as store data and to one of a vector fixed module 211, a permute module 213, a BFU module 215, a divide module 217, or a decimal floating-point unit (DFU) module 219

The output from the vector fixed module 210, the permute module 212, the BFU module 214, the divide module 216, or the crypto module 218 is fed back into the VSR 202 and the VSR 203. Likewise, the output from the vector fixed module 211, the permute module 213, the BFU module 215, the divide module 217, or the DFU module 219 is fed back into the VSR 202 and the VSR 203 is also fed back into the VSR 202 and the VSR 203.

Figure 3:
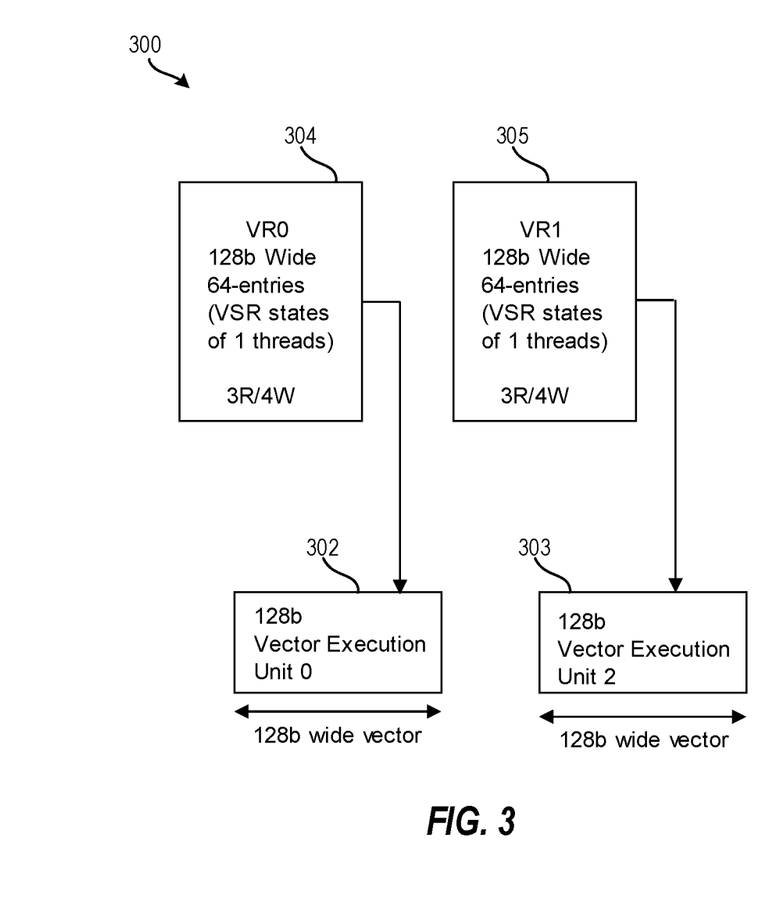
FIG. 3 depicts a vector-scalar register having vector execution units with their respective register files in single thread mode.

FIG. 3 depicts a vector-scalar register 300 having vector execution units 302, 303 with their respective register files 304, 305 in single thread mode. The VSR 300 can be one of VSR 202 and/or VSR 203, for example. The register files 304, 305 are each 128b wide register files with 64 entries each, and each of the register files 304, 305 contain the states of a single thread. In this example, the two sides of the register file contain the same content because the two sides work on the same thread. Accordingly, 64 spare entries on each side of the vector execution units 302, 303 exist. In one or more embodiments of the present invention, this enables register renaming in ST mode. In MT4 mode, these 64 spare entries are used to store architected states.

Figure 4:
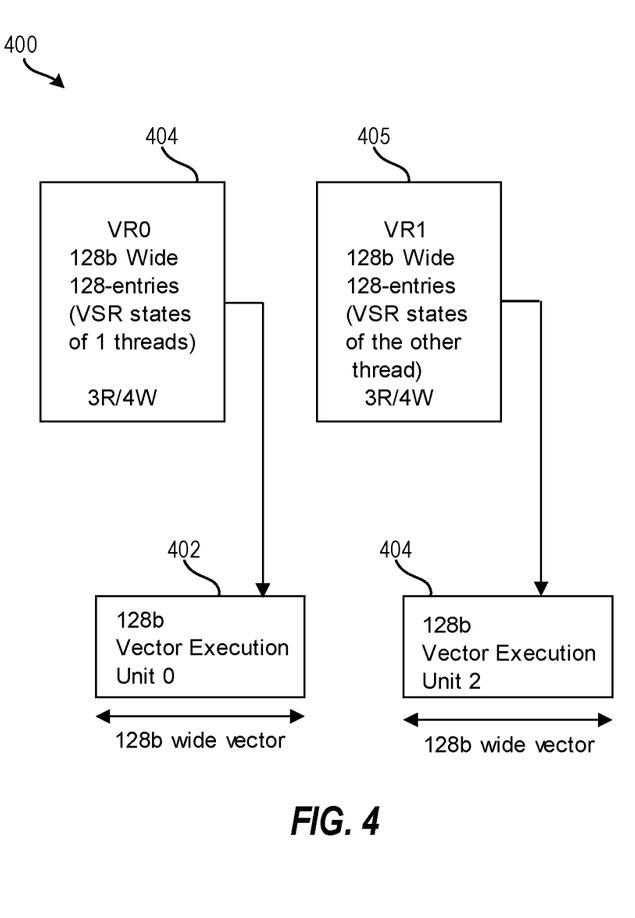
FIG. 4 depicts a vector-scalar register having vector execution units with their respective register files in SMT2 mode.

FIG. 4 depicts a vector-scalar register 400 having vector execution units 402, 403 with their respective register files 404, 405 in SMT2 (i.e., two threads are being processed) mode. The VSR 400 can be one of VSR 202 and/or VSR 203, for example. The register files 404, 405 each are 128b wide register files with 128 entries each. The register file 404 contains the states of a first thread, and the register file 405 contains the states of a second thread. In the example of FIG. 4, the register files 404, 405 are depicted without register renaming because the value of register renaming diminishes as the number of threads per core increases.

Figure 5:
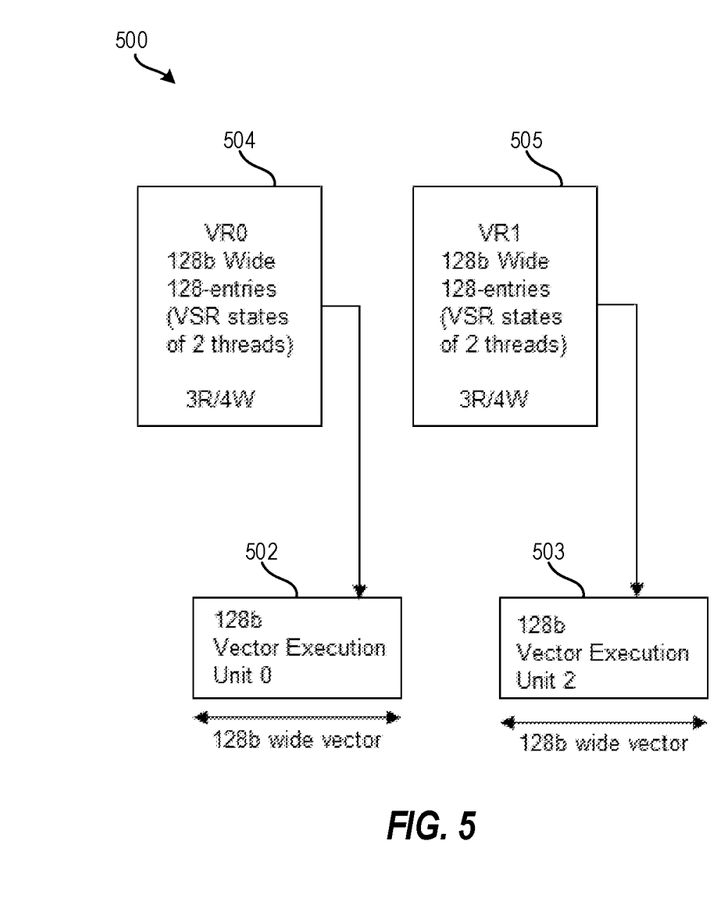
FIG. 5 depicts a vector-scalar register having vector execution units with their respective register files in SMT4 mode.

FIG. 5 depicts a vector-scalar register 500 having vector execution units 502, 503 with their respective register files 504, 505 in SMT4 (i.e., four threads are being processed) mode. The VSR 500 can be one of VSR 202 and/or VSR 203, for example. The register files 504, 505 are each 128b wide register files with 128 entries each. The register file 504 contains the states of two of the four threads (e.g., a first thread and a second thread), and the register file 505 contains the states of the other two of the four threads (e.g., a third thread and fourth thread). In the example of FIG. 5, the register files 504, 505 are depicted without register renaming. If register renaming is used in SMT4 mode, more register entries are needed.

In each of the examples of FIGS. 3-5, the vector execution units 302, 303, 402, 403, 502, 503 are 128b wide. That is, each of the vector execution units can only process 128 bit wide vectors.

Figure 6:
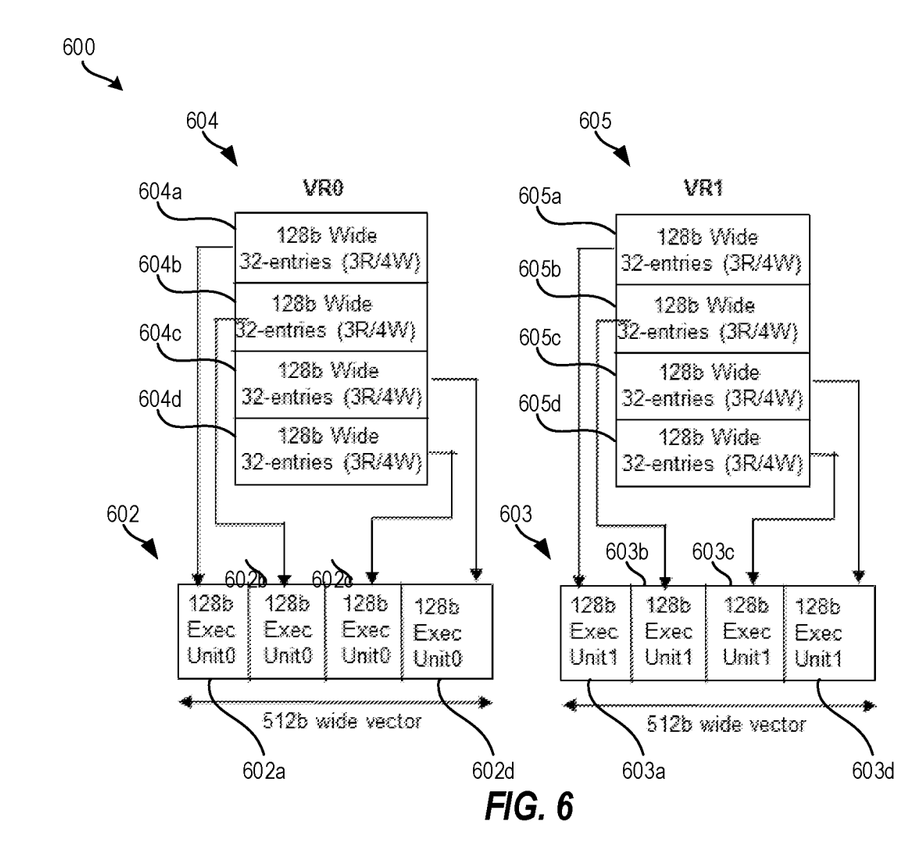
FIG. 6 depicts a vector-scalar register having vector execution units with their respective register files for wide vector execution in ST mode according to one or more embodiments of the present invention.

FIG. 6 depicts a vector-scalar register 600 having vector execution units 602, 603 with their respective register files 604, 605 for wide vector execution in ST mode according to one or more embodiments of the present invention. In particular, FIG. 6 depicts register file 604 as having four 128 bit wide, 32-entry register files 604a, 604b, 604c, 604d and register file 605 as having four 128 bit wide, 32-entry register files 605a, 605b, 605c, 605d. The VSR 600 can be one of VSR 202 and/or VSR 203, for example. That is, the register files 603, 605 are partitioned into a plurality of register files (e.g., register files 604a-604d and register files 605a-605d respectively).

The vector execution unit 602 is a 512b wide vector execution unit that is made up of four separate 128b vector execution units 602a, 602b, 602c, 602d that correspond to the register files 604a, 604b, 604c, 604d respectively. Similarly, the vector execution unit 603 is a 512b wide vector execution unit that is made up of four separate 128b vector execution units 602a, 602b, 602c, 602d that correspond to the register files 604a, 604b, 604c, 604d respectively. Accordingly, in ST mode, each of the vector execution units 602, 603 can process a 512b wide vector by utilizing each of the vector execution units that comprise the wide vector execution unit. However, in SMT2 mode and/or SMT4 mode, the 512b wide vector execution units 602, 603 are not available, as the individual vector execution units (e.g., 602a-602d, 603a-603d) are used by the corresponding register files to process the additional threads used in MT modes.

In this example, the physical size of the register files 604, 605 file is similar to the physical size of the register files 304, 305, 404, 405, 504, 505. That is, the register files 604, 605 occupy approximately the same physical space on a circuit board as the register files 304, 305, 404, 405, 504, 505 that only execute 128b wide instructions while the register files 605, 605 can execute 512b wide vector instructions.

Figure 7:
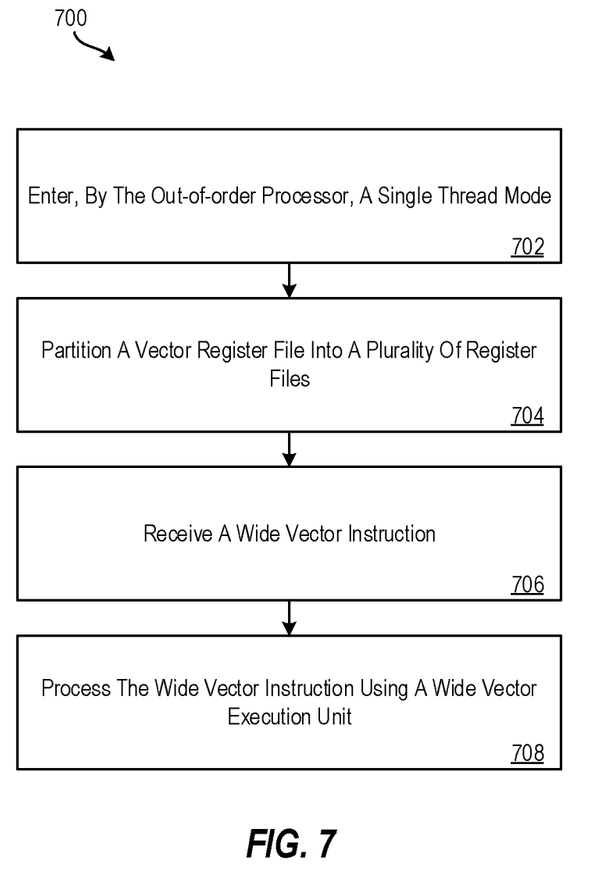
FIG. 7 depicts a flow diagram of a method for wide vector execution in ST mode according to one or more embodiments of the present invention.

FIG. 7 depicts a flow diagram of a method 700 for wide vector execution in ST mode according to embodiments of the invention. The method 700 can be implemented by a suitable processing system, such as the processing system 100 of FIG. 1, the processing system 800 of FIG. 8, or another suitable processing system.

At block 702, the OoO processor enters a single thread mode. For example, the OoO processor can be in a single thread mode or an MT mode (e.g., SMP2 mode, SMP4 mode, etc.). The OoO processor enters the single thread mode from one of the MT modes at block 702.

At block 704, the OoO processor partitions a vector register file (e.g., register file 604) into a plurality of register files (e.g., register files 604a-604d). Each of the plurality of register files is associated with a vector execution unit (e.g., vector execution units 602a-602d). The vector execution units form a wide vector execution unit (e.g., wide vector execution unit 602).

At block 706, a vector scalar register (VSR) of the OoO processor receives a wide vector instruction. For example, the VSR can receive the wide vector instruction from an LSU (e.g., the LSU 1042 and/or the LSU 1043 of FIG. 1).

At block 708, the wide vector execution unit processes the wide vector instruction. Additional processes also may be included, and it should be understood that the processes depicted in FIG. 7 represent illustrations, and that other processes may be added or existing processes may be removed, modified, or rearranged without departing from the scope and spirit of the present disclosure.

Figure 8:
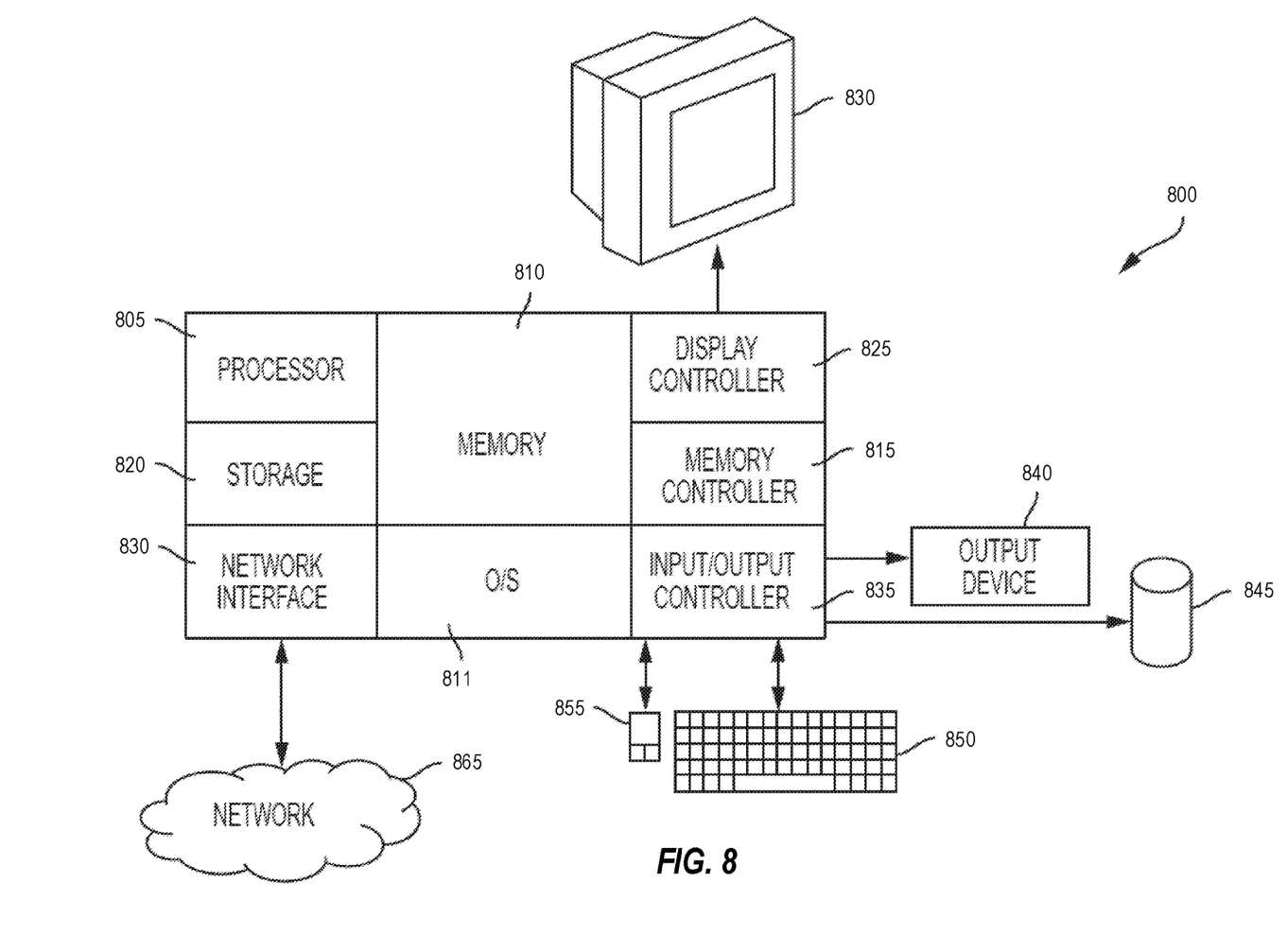
FIG. 8 depicts a processing system for implementing the techniques described herein according to one or more embodiments of the present invention.

Turning now to FIG. 8, a block diagram of a computer system 800 for implementing some or all aspects of wide vector execution in a single thread mode is generally shown according to one or more embodiments of the invention. The processing described herein can be implemented in hardware, software (e.g., firmware), or a combination thereof. In an exemplary embodiment, the methods described can be implemented, at least in part, in hardware and can be part of the microprocessor of a special or general-purpose computer system 800, such as a mobile device, personal computer, workstation, minicomputer, or mainframe computer.

In an exemplary embodiment, as shown in FIG. 8, the computer system 800 includes a processor 805, memory 810 coupled to a memory controller 815, and one or more input devices 845 and/or output devices 840, such as peripherals, that are communicatively coupled via a local I/O controller 835. These devices 840 and 845 can include, for example, a printer, a scanner, a microphone, and the like. A conventional keyboard 850 and mouse 855 can be coupled to the I/O controller 835. The I/O controller 835 can be, for example, one or more buses or other wired or wireless connections, as are known in the art. The I/O controller 835 can have additional elements, which are omitted for simplicity, such as controllers, buffers (caches), drivers, repeaters, and receivers, to enable communications.

The I/O devices 840, 845 can further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 805 is a hardware device for executing hardware instructions or software, particularly those stored in memory 810. The processor 805 can be a custom made or commercially available processor, a central processing unit (CPU), an auxiliary processor among several processors associated with the computer system 800, a semiconductor based microprocessor (in the form of a microchip or chip set), a microprocessor, or other device for executing instructions. The processor 805 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache can be organized as a hierarchy of more cache levels (L1, L2, etc.).

The memory 810 can include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 can incorporate electronic, magnetic, optical, or other types of storage media. Note that the memory 810 can have a distributed architecture, where various components are situated remote from one another but can be accessed by the processor 805.

The instructions in memory 810 can include one or more separate programs, each of which comprises an ordered listing of executable instructions for implementing logical functions. In the example of FIG. 8, the instructions in the memory 810 include a suitable operating system (OS) 811. The operating system 811 essentially can control the execution of other computer programs and provides scheduling, input-output control, file and data management, memory management, and communication control and related services.

Additional data, including, for example, instructions for the processor 805 or other retrievable information, can be stored in storage 820, which can be a storage device such as a hard disk drive or solid state drive. The stored instructions in memory 810 or in storage 820 can include those enabling the processor to execute one or more aspects of the dispatch systems and methods of this disclosure.

The computer system 800 can further include a display controller 825 coupled to a display 830. In an exemplary embodiment, the computer system 800 can further include a network interface 860 for coupling to a network 865. The network 865 can be an IP-based network for communication between the computer system 800 and an external server, client and the like via a broadband connection. The network 865 transmits and receives data between the computer system 800 and external systems. In an exemplary embodiment, the network 865 can be a managed IP network administered by a service provider. The network 865 can be implemented in a wireless fashion, e.g., using wireless protocols and technologies, such as WiFi, WiMax, etc. The network 865 can also be a packet-switched network such as a local area network, wide area network, metropolitan area network, the Internet, or other similar type of network environment. The network 865 can be a fixed wireless network, a wireless local area network (LAN), a wireless wide area network (WAN) a personal area network (PAN), a virtual private network (VPN), intranet or other suitable network system and can include equipment for receiving and transmitting signals.

Systems and methods for implementing wide vector execution in a single thread mode as described herein can be embodied, in whole or in part, in computer program products or in computer systems 800, such as that illustrated in FIG. 8.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for wide vector execution for an out-of-order processor, the method comprising:
   partitioning, by the out-of-order processor, a vector register file into a plurality of register files, each of the plurality of register files being associated with a vector execution unit, the vector execution units forming a wide vector execution unit, wherein each of the plurality of register files has three read wires and four write wires connected to its associated vector execution unit;
   receiving, by a vector scalar register of the out-of-order processor, a wide vector instruction;
   determining whether the out-of-order processor is operating a single thread mode or a multi-thread mode;
   responsive to determining that the out-of-order processor is operating in the single thread mode, processing, by the wide vector execution unit, the wide vector instruction; and
   responsive to determining that the out-of-order processor is operating in the multi-thread mode, preventing processing the wide vector instruction.

2. The computer-implemented method of claim 1, wherein the multithread mode is a symmetric multiprocessing 2 (SMP2) mode.

3. The computer-implemented method of claim 1, wherein the multithread mode is a symmetric multiprocessing 4 (SMP4) mode.

4. The computer-implemented method of claim 1, wherein the wide vector instruction is received from a load-store unit of the out-of-order processor.

5. The computer-implemented method of claim 1, wherein the wide vector instruction is larger than any one of the plurality of register files.

6. The computer-implemented method of claim 1, wherein vector execution unit is 128 bits, and wherein the wide vector execution unit is 512 bits.

7. The computer-implemented method of claim 1, wherein the vector register file is 128 bits and 128 entries, and wherein each of the plurality of register files is 128 bits and 32 entries.

* * * * *